United States Patent [19]

Maine

[11] Patent Number: 4,965,808
[45] Date of Patent: Oct. 23, 1990

[54] CODE TRACKING APPARATUS WITH IMPROVED RESOLUTION FOR SPREAD SPECTRUM RECEIVER

[75] Inventor: Reuben E. Maine, Charlottesville, Va.

[73] Assignee: Sperry Marine Inc., Charlottesville, Va.

[21] Appl. No.: 317,393

[22] Filed: Mar. 1, 1989

[51] Int. Cl.⁵ .............................................. H04L 9/00
[52] U.S. Cl. ..................................................... 375/1
[58] Field of Search ................................ 375/1, 87, 97

[56] References Cited

U.S. PATENT DOCUMENTS 4,457,006  6/1984  Maine ..................................... 375/87

*Primary Examiner*—Salvatore Cangialosi
*Attorney, Agent, or Firm*—Seymour Levine

[57] ABSTRACT

A tau-dither code correlation tracker includes a code clock and phase shifter for clocking the local code. A sequence of tau-dither patterns are applied to the phase shifter wherein each pattern has an incrementally displaced average phase shift with respect to an adjacent pattern in the sequence. The incremental average phase shift displacements are smaller than the phase shift increments provided by the code clock for enhanced resolution. The correlator output is amplitude detected and applied directly and through a plurality inverter to an electronic switch. The electronic switch is controlled to switchably apply the direct and polarity inverted amplitude signal to an integrator in accordance with the tau-dither pattern. The integrator output is compared to a threshold to control the sequence of tau-dither patterns.

9 Claims, 2 Drawing Sheets

CODE TRACKING APPARATUS WITH IMPROVED RESOLUTION FOR SPREAD SPECTRUM RECEIVER

BACKGROUND OF THE INVENTION

1. Field of the Invention

The invention relates to correlation tracking of a spread spectrum coded signal, particularly with respect to tracking the clear/acquisition (C/A) modulation in the Global Positioning System (GPS).

2. Description of the Prior Art

The GPS is a navigation system utilizing a plurality of satellites in diverse orbital positions. Each satellite transmits an L-band carrir bi-phase modulated by a spectrum spreading Pseudo Random Noise (PRN) C/A code identifying the satellite. The C/A code is utilized by a GPS receiver to acquire and lock to the satellite transmission. In the present day system, the carrier frequency is 1575.42 MHz an the C/A code has a clock rate of 1.023 MHz and a code length of 1023 bits. The code repeats the predefined sequence thereof once each millisecond.

In order to receive the GPS signal structure, a GPS receiver generates an exact duplicate of the C/A code and aligns it in time to the receive code using correlation detection. The correlation detection apparatus of the GPS receiver advances and retards the locally generated C/A code until a correlation peak is detected. Following code acquisition, the correlation detection apparatus tracks the code correlation peak. The corrlation detection apparatus utilizes a phase shifter to advance and retard the phase of the code clock by fractional bit phase shift increments to achieve acquisition and tracking. The accuracy and resolution of GPS receiver correlation detection apparatus in the acquisition and tracking functions thereof are limited by the phase shift increment provided by the phase shifter. The phase shift increment is dependent upon the available clock rate. Typical GPS receives utilize a 0.1 microsecond phase shift increment available from a 10.23 MHz clock rate.

It is desirable in present day GPS receiver designs to provide better resolution. In the prior art, this is achieved by utilizing a higher frequency code clock and/or a more complex phase shifting device to obtain the higher resolution. The prior art approach adds significant expense to the receiver because of the cost of the higher frequency hardware. This is particularly disadvantageous in the design of a low cost GPS receiver.

SUMMARY OF THE INVENTION

Finer resolution is achieved in the tracking system of a spread spectrum receiver by utilizing a sequence of tau-dither patterns with incrementally increasing or decreasing average phase shift. The patterns are sequenced in the appropriate phase shift direction until the correlation peak is attained. The incremental phase shift between successive patterns is finer than the phase shift between code clock increments thereby providing higher resolution without the expense and complexity of a higher frequency code clock.

BRIEF DESCRIPTION OF THE DRAWINS

DESCRIPTION OF THE PREFERRED EMBODIMENT

The present invention utilizes the tau-dither tracking function in a direct sequence spread spectrum correlation detector to provide improved resolution in code tracking without increasing the frequency of the code clock. A description of direct sequence spread spectrum systems may be found in the text "Spread Spectrum System", Second Edition, by R. C. Dixon, 1984 by John Wiley & Sons, Inc., pages 15–28. The technology of tau-dither tracking is disclosed in said text on pages 248–259 thereof. The above-referenced pages from said "Spread Spectrum Systems" are incorporated herein in their entirety. A GPS receiver in which the present invention may be utilized is disclosed in U.S. Pat. No. 4,457,006, issued Jun. 26, 1984, entitled "Global Positioning System Receiver", by the present inventor, and assigned to the present assignee. Said U.S. Pat. No. 4,457,006 is incorporated herein in its entirety.

Figure 1:
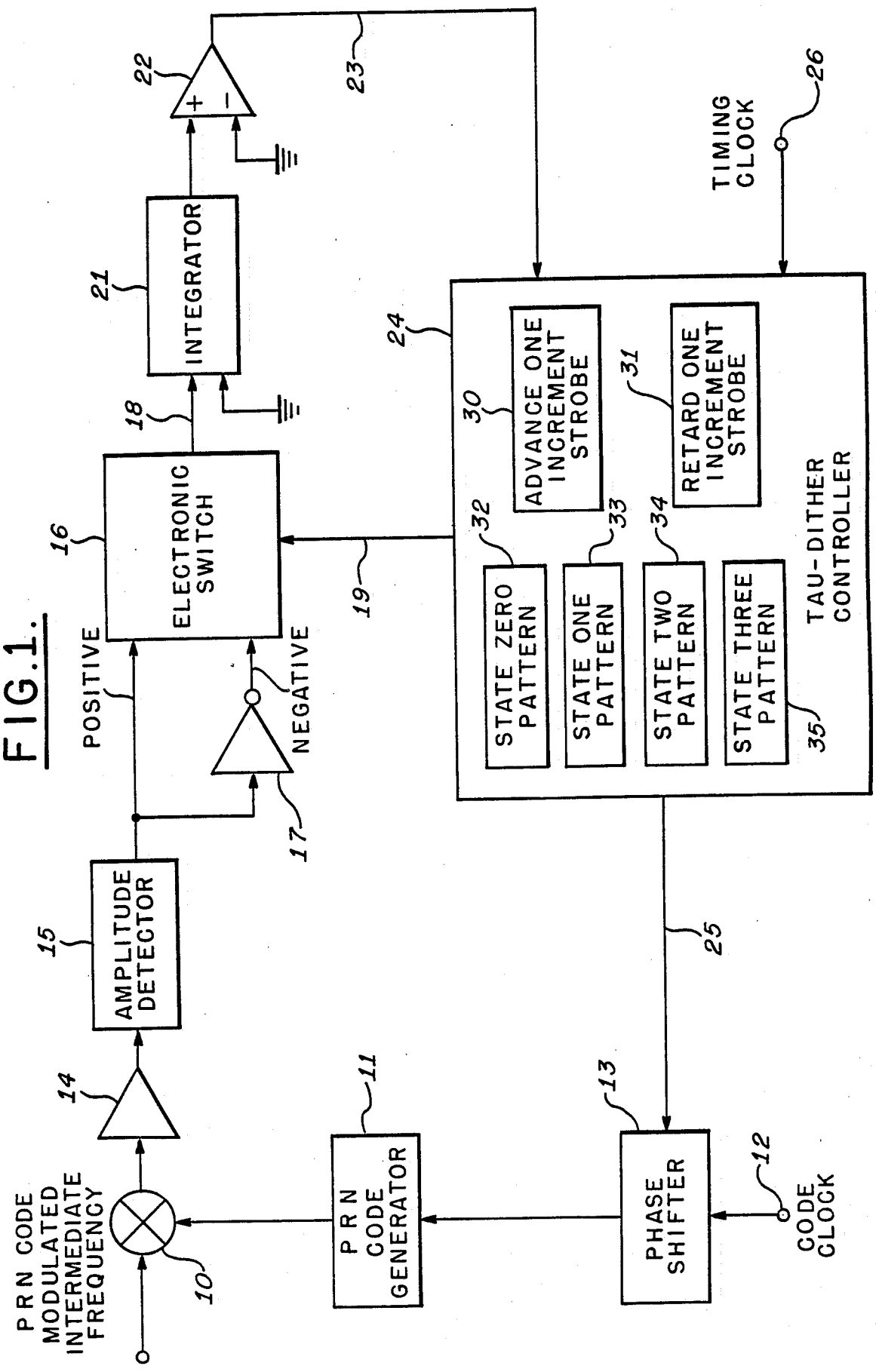
FIG. 1 is a schematic block diagram of a tau-dither tracker implemented in accordance with the invention.

Referring to FIG. 1, a schematic block diagram of a tau-dither correlation detector implemented in accordance with the present invention is illustrated. The C/A code modulated intermediate frequency is applied as an input to a correlator 10. The correlator 10 receives a locally generated C/A code from a PRN code generator 11 at a second input thereof. The local code applied by the code generator 11 to the correlator 10 is clocked by a code clock applied at a terminal 12 through a phase shifter 13. The output of the correlator 10 is applied through a narrow band amplifier 14 to an amplitude detector 15. The elements 10–15 generally correspond to those described in said U.S. Pat. No. 4,457,006. The PRN code modulated intermediate frequency is provided by the wideband I.F. amplifier 16 of FIG. 2 of said patent. The correlator 10 of FIG. 1 corresponds to the correlator 17 of the patent and the narrow band amplifier 14 corresponds to the narrow band I.F. amplifier 20 of said patent. As disclosed in the patent, the code clock applied to the terminal 12 is a 10.23 MHz clock which provides phase shift resolution of approximately 0.1 microseconds. This corresponds to a 0.1 code bit resolution or 0.1 chip. The amplitude detector 15 corresponds generally to the amplitude detector 51 of FIG. 3 of said patent.

The output of the amplitude detector 15 is applied to an input, denoted as positive, of an electronic switch 16 and through a polarity inverter 17 to a second input of the switch 16 doneted as negative. The electronic switch 16 is in effect a multiplexer that connects either the positive input or the negative input to an output 18 in accordance with a signal on a control input 19.

Although as illustrated, the system utilizes a two-state detector having states which are "early" and "late" with respect to the peak of the correlation function, it is recognized that this invention may also be utilized in a system having an "on-time" state typically incorporated in a separate channel which is not directly related to this invention.

The output 18 from the electronic switch 16 is applied as an input to an integrator 21 having a second input thereof connected to ground potential. Thus, depending on the signal on the output 18 of the electronic switch 16, the integrator 21 can charge positively or negatively with respect to ground. The output of the integrator 21 is applied to the positive input of a comparator 22 having the negative input thereof connected to ground potential. The comparator 22 provides a tri-state output on a line 23 denoting when the output of the integrator 21 is positive, negative, or null. The comparator 22 remains in the null or quiescent state as long as the correlation is within a predetermined limit determined by the null state of the comparator.

The output from the comparator 22 on the line 23 is applied to a tau-dither controller 24. The tau-dither controller 24 provides the control signal on the line 19 to the electronic switch 16 as well as a control signal on a line 25 to the phase shifter 13. The tau-dither controller 24 controls and times the operation of the phase shifter 13 and the eletronic switch 16 in accordance with a timing clock signal applied at a terminal 26.

The tau-dither controller 24 controls the phase shifter 13 to advance the phase of the code clock one increment or retard the phase of the code clock one increment. These functions are provided by an advance one increment strobe 30 and a retard one increment strobe 31, respectively. In the herein described embodiment, one increment is 0.1 chip. In accordance with the invention, the tau-dither controller 24 controls the phase shifter 13 to effect a plurality of tau-dither patterns denoted as state zero, state one, state two, and state three. These operations are provided by a state zero pattern function 32, a state one pattern function 33, a state two pattern function 34 and a state three pattern function 35, respectively, in a manner to be described.

The general arrangement of the apparatus of FIG. 1 provides a typical implementation of a tau-dither correlation detector. The addition of the elements 32-35 within the tau-dither controller 24 provides enhanced resolution in accordance with the invention, in a manner to be explained.

Figure 2:
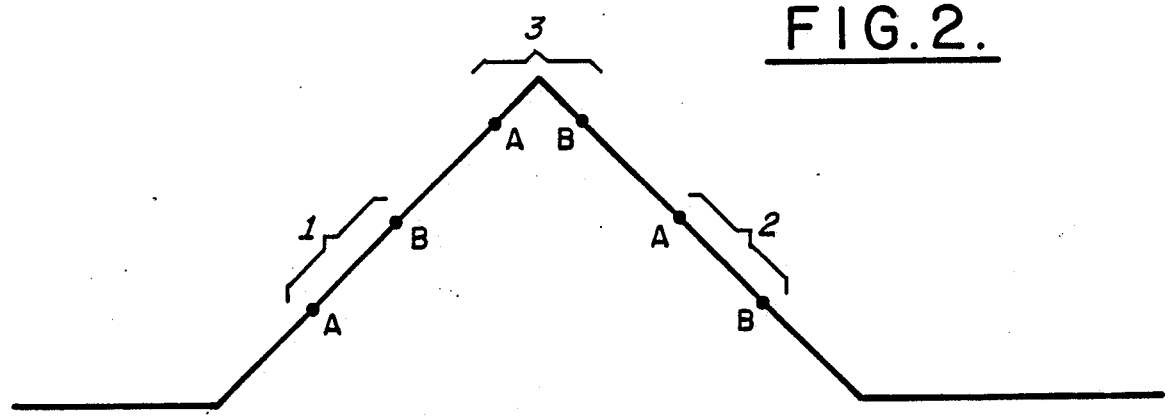
FIG. 2 is a graph of a correlation function useful in explaining the operation of tau-dither.

Generally, however, in accordance with conventional tau-dither operation, FIG. 2 illustrates the typical triangular correlation function of the receive C/A code with the locally generated C/A code as described in detail in said Dixon text. Briefly, with reference to FIG. 2 and continued reference to FIG. 1, the tau-dither controller 24 advances the phase of the local code by a fraction of a code chip; e.g. 0.2 chip, for a period of time and then returns the phase to the reference position for the same time period. With reference to condition "1" of FIG. 2, if the polarity selector switch 16 is in the positive position while the tau-dither is at the time period "B", and in the negative position during the time period "A", the integrator 21 will charge to a positive value and the output of the comparator 22 on the line 23 will be positive, indicating to the tau-dither controller 24 that the phase of the code should be advanced by one increment. If the correlation process is in condition "2" of FIG. 2, the output of the comparator 22 will be negative, indicating to the tau-dither controller 24 that a retardation of one increment of phase shift should be effected.

As described above, the present invention comtemplates a system utilizing a tri-state comparator having a null or equal state between the positive and negative states. Condition "3" of FIG. 2 would cause such a comparator to be in the equal state.

It is appreciated from the foregoing that in the prior art, the finest increment of mesurement is limited to the fractional bit of phase shift that may be effected in the phase shifter 13. In the prior art, when higher resolution is desired, a higher frequency code clock at the terminal 12 into the phase shifer 13 is utilized, resulting in more expensive and more complex hardware. In the prior art, the increment of phase shift utilized in such a tau-dither system is always a constant. The amount of phase dither introduced is, in the prior art, generally a constant fraction of a code chip. The present invention utilizes a time variation of the amount of the phase dither to extend the resolution of the detecting system without the necessity of increassing the code clock frequency.

Figure 3:
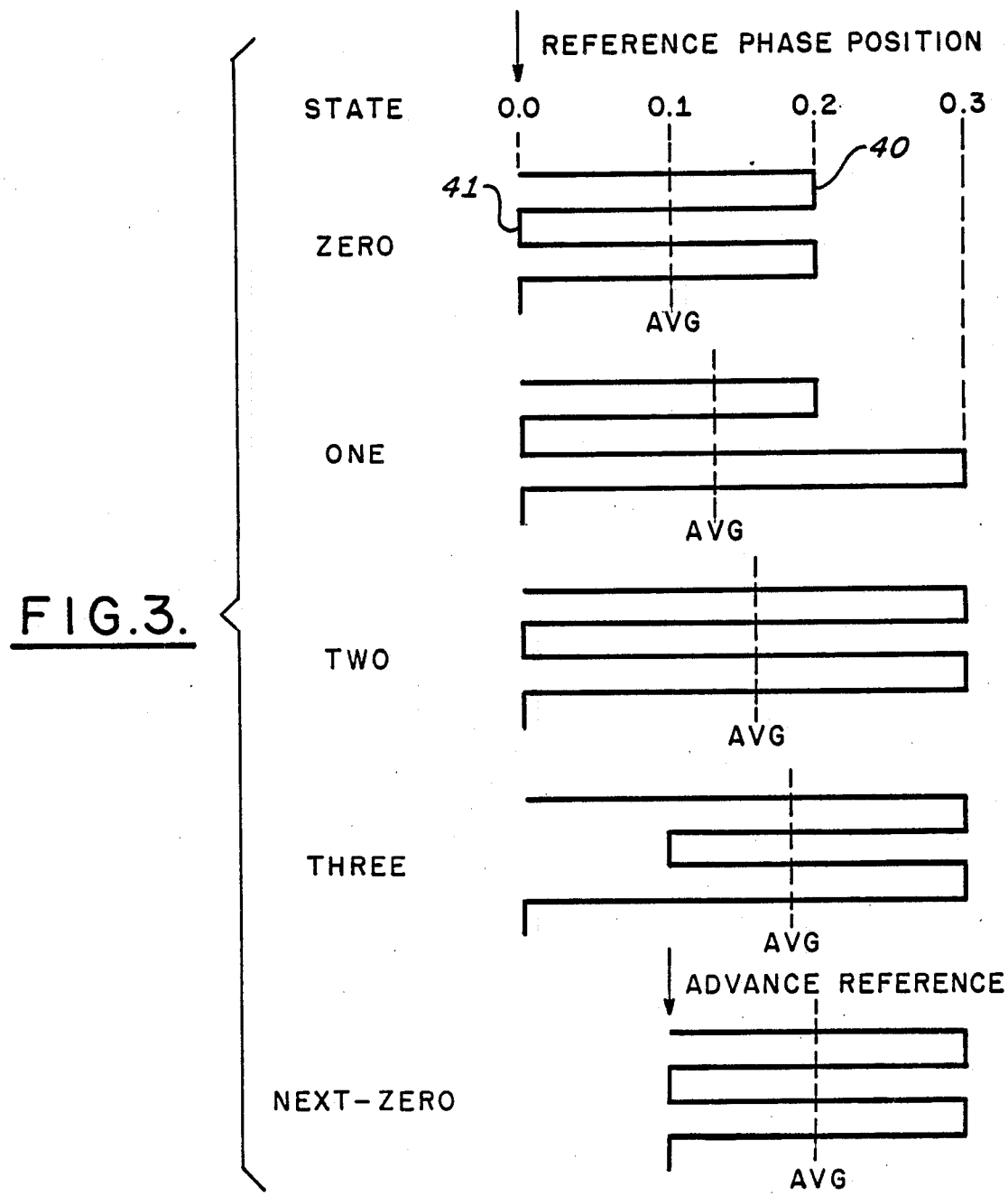
FIG. 3 is a diagram illustrating a sequence of tau-dither patterns utilized in implementing the present invention.

Referring now to FIG. 3, with continued reference to FIG. 1, the sequence of tau-dither patterns implemented by the functions 32-35 are illustrated. With respect to the state zero pattern of FIG. 3, the state zero patter function 32 of the tau-dither controller 24 is operating at a relative reference phase position of 0.0 bits. For a period of the time denoted by reference numeral 40, the tau-dither controller 24 controls the phase shifter 13 to advance the phase of the code clock by 0.2 bits. The tau-dither controller 24 also controls the switch 16 to the positive position. After the time interval 40 has elapsed as controlled by the timing clock at the terminal 26, the tau-dither controller 24 returns the phase shifter 13 to the reference phase position of 0.0 bits for a comparable time period denoted by reference numeral 41. During the time period 41, the switch 16 is controlled to the negative state. The state zero dither pattern is repeated for a predetermined number of cycles. It is appreciated that the average phase shift of the state zero pattern is 0.1 bits. After application of the state zero dither pattern, the comparator 22 examines the output of the integrator 21. If the correlation peak were exactly 0.1 bits above the reference phase position, the output of the integrator 21 would be at zero threshold. If so, the tau-dither controller 24 would continue to utilize the state zero pattern function 32 unitl the correlation peak changes from this position.

If the output of the comparator 22 is high after application of the state zero tau-ditehr pattern, indicating that the phase must be advanced to locate the correlation peak, the tau-dither controller 24 advances the pattern of tau-dither from the state zero pattern 32 to the state one pattern 33. It is appreciated from FIG. 3 that the state one pattern of tau-dither exhibits an average phase shift of 0.125 bits above the reference position of 0.0 bits. Thus, if the correlation peak is exactly 0.125 bits above the reference, the output of the integrator 21 will be zero. If, however, the output of the comparator 22 is still positive after application of the state one dither, the tau-dither controller 24 advances to the state two pattern 34. If the correlation peak is exactly 0.150 bits above the reference of 0.0, the output of the integrator 21 will be zero after application of the state two pattern. If the comparator 22 output is, however, still positive, the tau-dither controller 24 advances to the state three pattern 35 which seeks the correlation peak at exactly 0.175 bits above the reference of 0.0 bits. If the output of the comparator 22 is still positive after application of the state three pattern, the tau-dither controller 24 advances the reference phase by the least increment of phase shift, which in the herein described embodiment is 0.1 bits, and returns to state zero. The 0.1 bit phase advance in the reference is effected by the advance one increment strobe function 30. The output of the integrator 21 would now be at the zero threshold if the correlation peak were exactly 0.2 bits above the previous reference of 0.0 bits. When the correlation peak is located, the tracker dwells at the current pattern unitl a correlation peak shift requires further sequencing.

It is appreciated from the foregoing that irrespective of the reference phase position, the state zero, one, two, and three tau-dither patterns track correlation peaks that are 0.100, 0.125, 0.150 and 0.175 bits, respectively, above the current reference.

In a similar manner, if the output of the comparator 22 had been negative, the tau-dither controller 24 would effect a transition through the patterns illustrated in FIG. 3 in the reverse direction, inserting a least increment of phase retard (0.1 chip) when effecting the transition from state zero to state three. The 0.1 bit of phase retard is effected by the retard one increment strobe function 31.

Thus, it is appreciated, that the above-described embodiment of the present invention detects the peak of the correlation function with a resolution four times finer than the least increment of phase shift available from the phase shifter 13 and the code clock applied at the terminal 12.

Utilizing more complex tau-dither patterns than those illustrated in FIG. 3 will provide still finer detection resolution if sufficient time for integration is available. The increment of 0.1 bit of phase shift and the base tau-dither increment of 0.2 bits are for the purposes of description only and are not to be considered limiting in practicing the invention.

The above-described embodiment of the invention was explained in terms of a tri-state comparator. A two-state comparator may be utilized in practicing the invention which has only positive or negative outputs, omitting the null state. A system utilizing such a comparator will track in the manner described above except that the phase shift circuitry will never linger in a given state but will always change states either plus or minus at each decision point.

It is appreciated from the foregoing that shifting up and down in the state sequence causes the phase shifter 13 effectively to advance or retard the phase of the correlation signal by one-quarter of one clock pulse (approximately 0.025 microseconds) for each shift. Additional, the strobe up and strode down functions 30 and 31 cause the phase shifter 13 to advance or retard the phase of the correlation signal by one clock pulse (approximately 0.1 microsecond) for each strobe. The strobes 30 and 31 are utilized in state sequence transitions between states zero and three. In a specific embodiment of the invention, the phase of the local correlation code is shifted up or down at the end of each 256 millisecond. At the end of each 256 millisecond period, the output of the comparator 22 is tested by the tau-dither controller 24 to determine whether a change should be effected up or down in the positive or negative direction. Each of the time intervals 40 and 41, etc. of FIG. 3, are 8 milliseconds each and the current state pattern is continued for 256 milliseconds. At the end of the 256 millisecond period, the output of the comparator 22 is tested by the tau-dither controller 24 to shift either up or down in the state sequence as appropriate. When tracking in the positive direction, the transition between state three and state zero includes a 0.1 phase advance command to the phase shifter 13 by the strode 30. When tracking in the negative direction, the transition between state zero and state three includes a 0.1 phase retard command to the phase shifter 13 from the strode 31. This modification to the tau-dither function provides a four times improvement in the resolution normally provided by the phase shifter 13 driver by the code clock applied at the terminal 12.

It is appreciated that in present day GPS receives implemented with programed microprocessors, the improvement in resolution described herein may be achieved at virtually no expense by altering the computer software controlling the tau-dither function to effect the patterns and sequencing described above. Thus, the present invention provides an improvement to the existing methods of tracking the correlation of a spread spectrum signal by adjusting the tau-dither tracking function thereby achieving a significant improvement in effective tracking resolution.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. Tau-dither correlation code tracking apparatus for tracking an input code, comprising code generator means for generating a local code identical to said input code, a code clock source for providing a code clock, phase shifter means responsive to said code clock for phase shifting said code clock to provide a shifted code clock with predetermined phase shift increments, said shifted code clock being applied to said code generator means for clocking said local code, correlator means responsive to said input code and said local code for correlating said input code with said local code to provide a correlation output in accordance therewith, tau-dither controller means for providing a sequence of tau-dither phase shift patterns to control said phase shifter means, said patterns having average phase shifts, respectively, with incremental displacements therebetween, said incremental displacements being smaller than said phase shift increments, each said phase shift pattern being a series of consecutive increasing and decreasing phase shifts between integral multiples of said predetermined phase shift increments to provide said average phase shift associated therewith, each said phase shift pattern being differrent from phase shift patterns adjacent thereto in said sequence so as to provide said incremental displacements between said average phase shifts, and detector means responsive to said correlation outoput for controlling said tau-dither controller to sequentially provide said patterns in accordance with said correlation output.

2. The apparatus of claim 1 wherein said series of phase shifts include phase shifts between a reference phase position and said integral multiples of said predetermined phase shift increments.

3. The apparatus of claim 1 wherein said tau-dither controller means comprises means for providing said sequence of tau-dither patterns followed by a phase shift of said code clock of said predetermined phase shift increment and continuing on with a repetition of said sequence of tau-dither patterns.

4. The apparatus of claim 3 wherein said tau-dither controller means comprises means for sequencing through said tau-dither patterns in a direction according to said correlation output.

5. The apparatus of claim 4 wherein said tau-dither controller means comprises means for sequencing through said tau-dither patterns in a direction of advancing average phase shifts followed by an advancing phase shift increment of said code clock.

6. The apparatus of claim 4 wehrein said tau-dither controller means comprises means for sequencing through said tau-dither patterns in a direction of retarding average phase shifts followed by a retarding phase shift increment of said code clock.

7. The apparatus of claim 2 wherein said detector means comprises
   amplitude detector means responsive to said correlation output for providing an amplitude signal in accordance therewith,
   polarity inverter means responsive to said amplitude signal for providing an inverted amplitude signal,
   switching means responsive to said amplitude signal and said inverted amplitude signal for switchably proividing said amplitude signal or said inverted amplitude signal on an output thereof,
   integrator means responsive to said output of said switching means for providing an integrated output thereof, and
   comparator means for comparing said integrated output to a reference threshold for providing a tau-dither control signal to said tau-dither controller means.

8. The apparatus of claim 7 wherein said tau-dither controller means includes means for providing a switch control signal to said switching means for controlling said switching means in accordance with said series of phase shifts comprising each said tau-dither pattern.

9. The apparatus of claim 8 wherein said switching means includes a null input and wherein said switching means comprises means for switching between said amplitude signal, said inverted amplitude signal and said null input in accordance with said switch control signal.

* * * * *